United States Patent
Zollers et al.

(10) Patent No.: US 9,255,688 B2
(45) Date of Patent: Feb. 9, 2016

(54) OSCILLATING INTERFACE FOR LIGHT MIXING LENSES

(71) Applicant: Fraen Corporation, Reading, MA (US)

(72) Inventors: Michael Zollers, Burlington, MA (US); James Preston, Malden, MA (US); Brien J. Housand, Worcester, MA (US)

(73) Assignee: Fraen Corporation, Reading, MA (US)

( * ) Notice: Subject to any disclaimer, the term of this patent is extended or adjusted under 35 U.S.C. 154(b) by 210 days.

(21) Appl. No.: 13/787,148

(22) Filed: Mar. 6, 2013

(65) Prior Publication Data

US 2013/0265777 A1 Oct. 10, 2013

Related U.S. Application Data

(60) Provisional application No. 61/607,134, filed on Mar. 6, 2012.

(51) Int. Cl.
*F21V 5/04* (2006.01)
*G02B 19/00* (2006.01)
*F21V 13/04* (2006.01)
*F21Y 101/02* (2006.01)

(52) U.S. Cl.
CPC . *F21V 5/045* (2013.01); *F21V 5/04* (2013.01); *F21V 13/04* (2013.01); *G02B 19/0014* (2013.01); *G02B 19/0028* (2013.01); *G02B 19/0061* (2013.01); *F21Y 2101/02* (2013.01)

(58) Field of Classification Search
CPC ......... F21V 5/002; F21V 5/04; F21V 7/0091; F21V 7/09; F21V 13/04; F21V 5/045; F21V 5/048; F21V 7/06
See application file for complete search history.

(56) References Cited

U.S. PATENT DOCUMENTS

| | | | |
|---|---|---|---|
| 7,777,955 B2 | 8/2010 | Cassarly et al. | |
| 2004/0165388 A1* | 8/2004 | Shoji | 362/304 |
| 2005/0024744 A1* | 2/2005 | Falicoff et al. | 359/737 |
| 2005/0255985 A1* | 11/2005 | Masuda | 501/45 |
| 2006/0067640 A1* | 3/2006 | Hsieh et al. | 385/146 |
| 2007/0024971 A1 | 2/2007 | Cassarly et al. | |
| 2010/0226127 A1* | 9/2010 | Bigliatti et al. | 362/235 |
| 2011/0051394 A1* | 3/2011 | Bailey | 362/84 |
| 2014/0001507 A1* | 1/2014 | Streppel et al. | 257/98 |

FOREIGN PATENT DOCUMENTS

DE WO2012130495 * 1/2012 ............... G02B 3/08

OTHER PUBLICATIONS

PCT International Report of Patentability and PCT Written Opinion of the International Searching Authority for PCT/US2013/029342 mailed Sep. 18, 2014 (5 sheets).

* cited by examiner

*Primary Examiner* — Julie Bannan
(74) *Attorney, Agent, or Firm* — Reza Mollaaghababa; Thomas J. Engellenner; Pepper Hamilton LLP

(57) ABSTRACT

In some aspects, an optic is disclosed that includes a light input interface having a rippled surface that can mix the light incident thereon as the light propagates within the optic from the rippled surface to a peripheral surface of the optic, which is configured to redirect the light incident thereon to an output surface through which the light exits the optic.

27 Claims, 14 Drawing Sheets

OSCILLATING INTERFACE FOR LIGHT MIXING LENSES

RELATED APPLICATION

The present application claims priority to a provisional application entitled "Oscillating Interface for Light Mixing Lenses" filed Mar. 6, 2012 and having a Ser. No. 61/607,134, which is herein incorporated by reference in its entirety.

FILED

The present patent application generally relates to optics, lenses and lighting systems and methods, and particularly to such optics, lenses and lighting systems and methods for light mixing and/or color mixing.

INTRODUCTION

Lenses and lighting systems for light sources, such as light emitting diodes, can be utilized in a wide variety of applications. Many lighting applications call for the ability to mix light emitted from a single light source, e.g., to obtain a desired light intensity profile and/or reduce source imaging. Further, in some applications, it is desirable to mix light emitted from multiple sources, e.g., sources producing light of different colors. It is, however, difficult to produce uniformly mixed light. Many conventional light-mixing systems provide textured surfaces to spread the light from a light source. The efficiency and capabilities of such systems are limited and their illumination characteristics are typically sub-par.

Accordingly, there is a need for improved light-mixing optics, lenses and respective lighting systems and methods.

SUMMARY

In one aspect, an optic is disclosed that includes a lens body having a light input interface configured to receive light generated by a light source, said light input interface having a rippled surface through which at least a portion of the received light enters the lens body. The optic further includes an output surface through which light exits the lens body, and a peripheral surface configured to receive at least a portion of the light entering the lens body via said rippled peripheral surface and to redirect at least a portion of said received light to the output surface for exiting the lens body.

In some embodiments, the light input interface can form a cavity for receiving light from a light source. In some embodiments, the cavity is configured to receive a light source, or a portion thereof. In other embodiments, the light source is disposed outside the cavity with the light entering the cavity.

In some embodiments, the peripheral surface of the lens body is configured to redirect the light it receives via the rippled surface of the input interface by total internal reflection (TIR). In some embodiments, the peripheral surface of the lens body is configured to redirect such received light by specular reflection (e.g., via reflection from a thin metallic layer disposed on that surface). In some embodiments, the peripheral surface of the lens body is configured to redirect the received light so as to form a substantially collimated light beam exiting the lens body through the output surface. The term "substantially collimated" as used herein refers to a bundle of rays in which the direction of travel of each ray exhibits a deviation equal to or less than 5%, or equal to or less than 3%, relative to the direction of travel of other rays, or relative to a reference direction (e.g., a central ray of the bundle).

In some embodiments, the rippled surface of the light input interface comprises a plurality of periodic surface oscillations. In some such embodiments, the surface oscillations exhibit a uniform oscillation amplitude while in some other such embodiments, the surface oscillations exhibit a non-uniform amplitude. In some embodiments, an oscillation amplitude of the surface oscillations can be in a range of about 10 micrometers (microns) to about 1 millimeter (mm). The surface oscillations can exhibit a variety of different frequencies. In some embodiments, the surface oscillations can exhibit a frequency in a range of about $5/\pi$ to about $180/\pi$ $(radian)^{-1}$.

In some embodiments, the rippled surface forms a peripheral surface of the light input interface and the light input interface can further include a top surface adapted to receive a portion of the light generated by the light source and to direct the received light to the output surface of the optic for exiting the lens body. In some embodiments, the top surface of the input interface is substantially flat while in other embodiments it can be a curved surface. In some embodiments, the top surface of the input interface can include a plurality of surface undulations, such as microlenses. Such surface undulations can be employed, e.g., to mix the light rays that are incident on the top surface via the light source and enter the lens body via refraction at that surface. For example, many of such light rays can intersect within the lens body as they propagate from the top surface of the input interface to the output surface of the lens body. In some other embodiments, the rippled surface of the light input interface extends from a base of the surface to a top surface portion thereof that is free of surface undulations. In some embodiments, the rippled surface of the light input interface extends from a base of the surface to an apex thereof.

In some embodiments, a ratio of a length of the peripheral surface of the input interface along a reference longitudinal axis (e.g., an optical axis of the optic) relative to a respective length of the optic can be in a range of about 0.1 to about 1.

In further aspects, an optic is disclosed that includes a light input interface adapted to receive light from a light source, said input interface having a rippled surface at which at least a portion of the received light is refracted to enter the optic, an output surface for receiving at least a portion of said light entering the optic, wherein at least a portion of the light received at the output surface exits the optic via refraction at said output surface. In some embodiments, the rippled surface of such an optic comprises a plurality of ridges and troughs that extend from a base of the surface toward an apex thereof (e.g., an intersection of an optical axis of the optic with the rippled surface). In some such embodiments, the ridges and troughs, or at least a portion thereof, reach the apex. In some embodiments, the rippled surface comprises a plurality of periodic oscillations, where the oscillations exhibit a uniform or a non-uniform amplitude. In some implementations, the periodic surface oscillations exhibit an amplitude of at least about 10 micrometers (microns), e.g., an amplitude in a range of about 10 microns to about 1 millimeter (mm). In some embodiments, the periodic surface oscillations exhibit an oscillation frequency in a range of about $5/\pi$ to about $180/\pi$ $(radian)^{-1}$.

In some embodiments, the optic comprises an optical axis about which the light input surface and the output surface are disposed. In some cases, a ratio of a length of the light input interface along the optical axis relative to a length of the optic along the optical axis is in a range of about 0.1 to about 1.

In some embodiments, the rippled surface forms a peripheral surface of the light input interface. In such cases, the light input interface can include a top surface. While in some embodiments the top surface of the light input interface is flat, in other embodiments it can be curved. Further, in some embodiments, the top surface of the light input interface can include a plurality of microlenses.

Further understanding of various aspects of the invention can be obtained by reference to the following detailed description and the associated drawings, which are described briefly below.

DETAILED DESCRIPTION

Figure 1A:
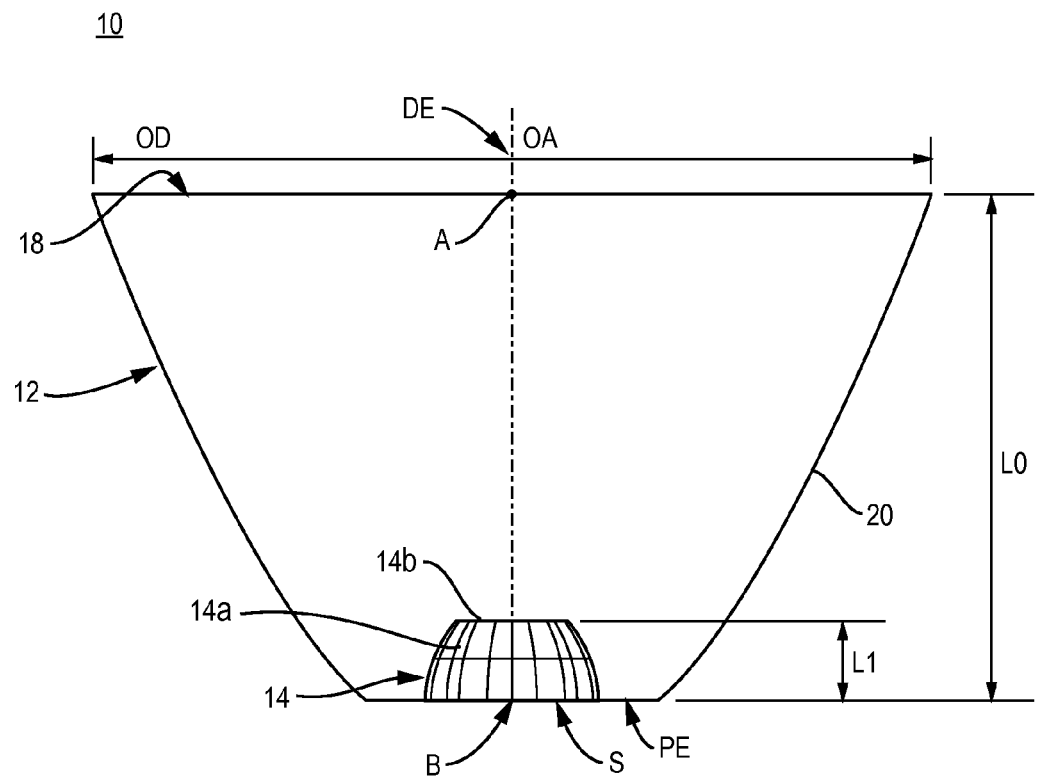
FIG. 1A is a schematic view of an optic according to an embodiment of the invention having a light input interface according to the present teachings.
Figure 1B:
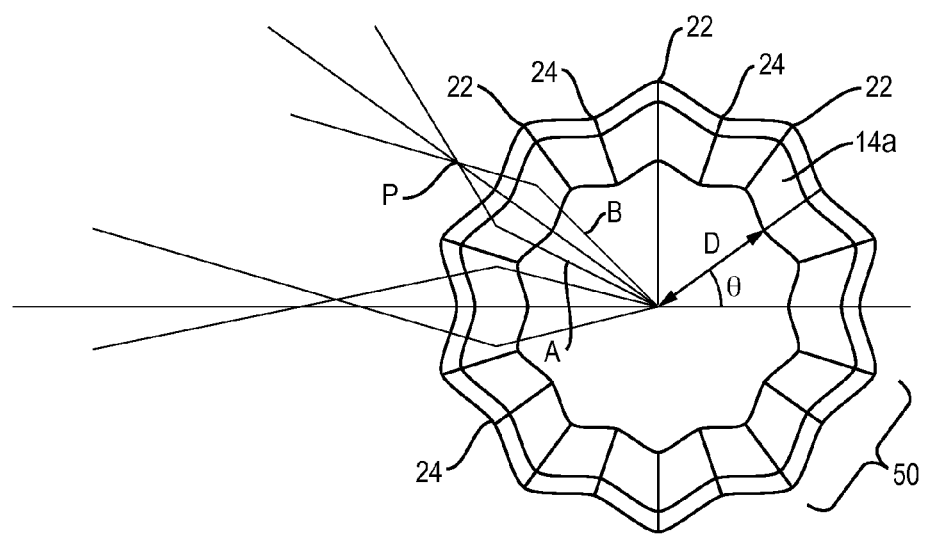
FIG. 1B is a schematic perspective top view of the light input interface of the optic depicted in FIG. 1A.
Figure 1C:
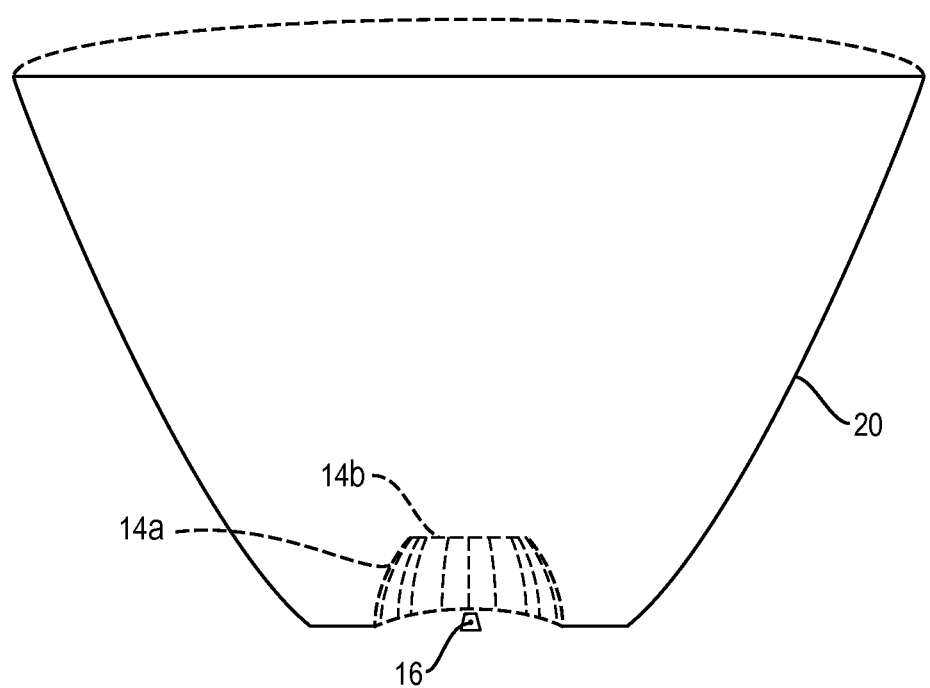
FIG. 1C is a schematic cross-sectional view of the optic of FIG. 1A receiving light from a light source via its light input interface.
Figure 1D:
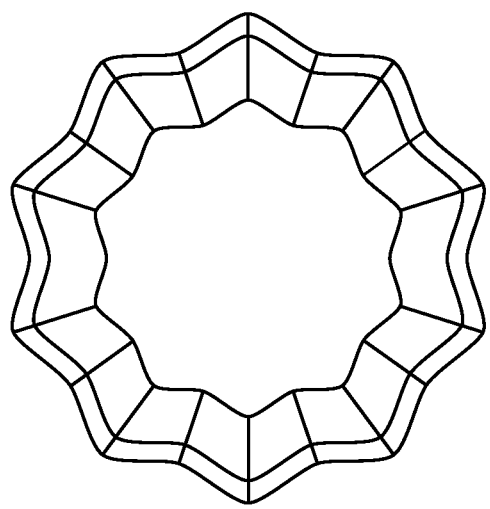
FIG. 1D is a schematic perspective top view of the light input interface of the optic of FIG. 1A.
Figure 1E:
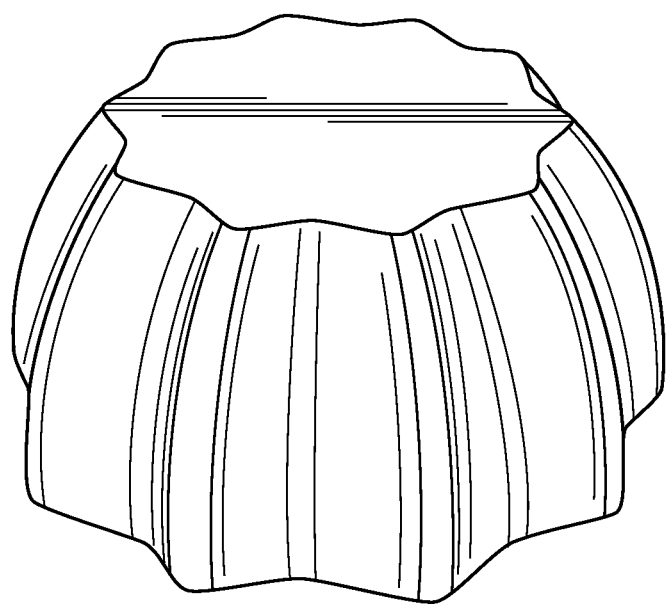
FIG. 1E is another schematic perspective view of the light input interface of the optic of FIG. 1A, FIG. 2A schematically depicts a cross-section of the rippled peripheral surface of the light input interface of the optic of FIG. 1A in a surface perpendicular to the optical axis, FIG. 2B schematically depicts a cross-sectional view of a light input interface according to another embodiment exhibiting a plurality of surface oscillations with a non-uniform amplitude, FIG. 3A schematically depicts a light input interface according to an embodiment of the invention, FIG. 3B schematically depicts a light input interface according to an embodiment of the invention, FIG. 3C schematically depicts a light input interface according to an embodiment of the invention.

FIGS. 1A-1E schematically depict an optic 10 according to an embodiment of the invention that comprises a lens body 12 disposed about an optical axis (OA), where the optic includes a light input interface 14 adapted to receive light from a light source, such as the illustrative light source 16 schematically shown in FIG. 1C. In this illustrated embodiment, the input interface forms a cavity for receiving the light emitted by the light source 16. In some embodiments, the cavity can be configured to receive the light source itself, or at least a portion thereof. In other embodiments, the light source is located external to the cavity, but optically coupled to the cavity such that the cavity receives at least a portion of the light emitted by the source. As discussed in more detail below, in this illustrative embodiment, the light input interface 14 includes a rippled peripheral surface 14a and a top surface 14b.

The light received by the input interface, or at least a portion thereof, enters the lens body through the surfaces of the input interface, e.g., via refraction at those surfaces. The optic 10 also includes an output surface 18 through which the light can exit the lens body, and a peripheral surface 20 that is configured to receive at least a portion of the light entering the lens body via the light input interface 14 and to redirect that light, or at least a portion thereof, to the output surface 18 for exiting the lens body. In this illustrative embodiment, the peripheral surface is configured to redirect the light it receives from the light input interface to the output surface 18 via total internal reflection (TIR). In other embodiments, the peripheral surface can be configured to redirect the light incident thereon to the output surface 18 via specular reflection. For example, in some such embodiments, a thin metallic layer can be disposed on the peripheral surface, or at least a portion thereof, to cause specular reflection of the incident light.

The rippled peripheral surface 14a of the light input interface 14 includes a plurality of surface undulations (See, e.g., FIG. 1B). In particular, in this illustrative embodiment, the surface undulations of the rippled peripheral surface 14a can be characterized by a plurality of ridges 22 and valleys (troughs) 24. In other words, the undulations of the rippled peripheral surface 14a of the input interface can be characterized as variations of the orthogonal distances of various points on that surface relative to the optical axis (OA). An orthogonal distance as used herein refers to the length of a line segment that connects a surface point to the optical axis (OA) in a plane that is orthogonal to the optical axis, e.g., distance D shown in FIG. 1B. For example, as shown in FIG. 1B, the surface points along the ridges are farthest away from the optical axis and the points long the valleys are the closest to the optical surface with the distances of other surface points varying between these two extremes.

In some embodiments, the surface undulations are in the form of periodic surface oscillations. For example, with reference to FIG. 1B, in this exemplary embodiment, the surface undulations comprise a surface oscillation (SO) that is repeated 10 times in a $2\pi$ radian rotation about the optical axis (OA). In other words, the frequency of the surface oscillations in this example is $10/2\pi$ (radian)$^{-1}$. Other oscillation frequencies can also be employed. By way of example, in some embodiments, the frequency of the surface oscillations can be in a range of $5/\pi$ to about $180/\pi$ (radian)$^{-1}$.

Figure 2A:
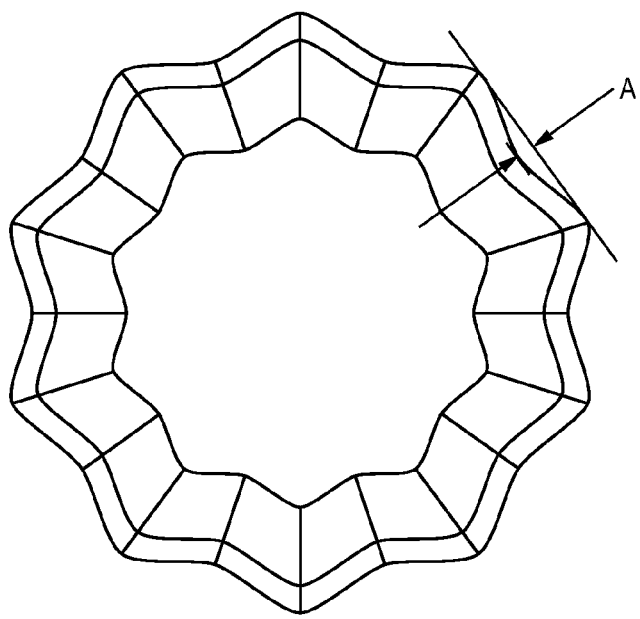
Figure 2B:
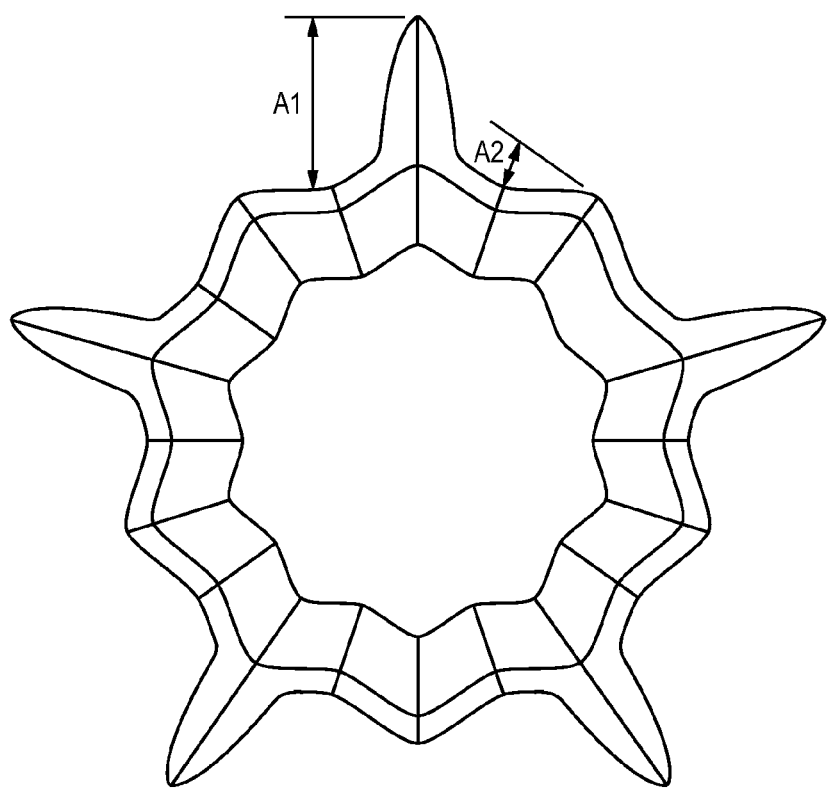

The surface undulations can have uniform or non-uniform amplitudes. An amplitude of a surface oscillation as used herein refers to the distance between a peak and an adjacent valley of a surface oscillation. For example, FIG. 2A depicts a cross-section of the rippled peripheral surface 14a perpendicular to the optical axis (OA), which illustrates a cross-sectional view of the surface oscillations. FIG. 2A shows that in this illustrative embodiment, the surface oscillations can be characterized by a uniform oscillation amplitude (A). In some other embodiments, however, the oscillation amplitude(s) of the surface undulations can be non-uniform. For example, FIG. 2B schematically depicts a cross-sectional view of the rippled peripheral surface of a light input interface according to another embodiment, which comprises a plurality of repeating surface oscillations (SO), where the surface oscillations are characterized by a non-uniform amplitude. For example, in this example, each surface oscillation can be characterized by two peak-to-valley distances A1 and A2, each measured between a peak and an adjacent valley of the surface.

Figure 3A:
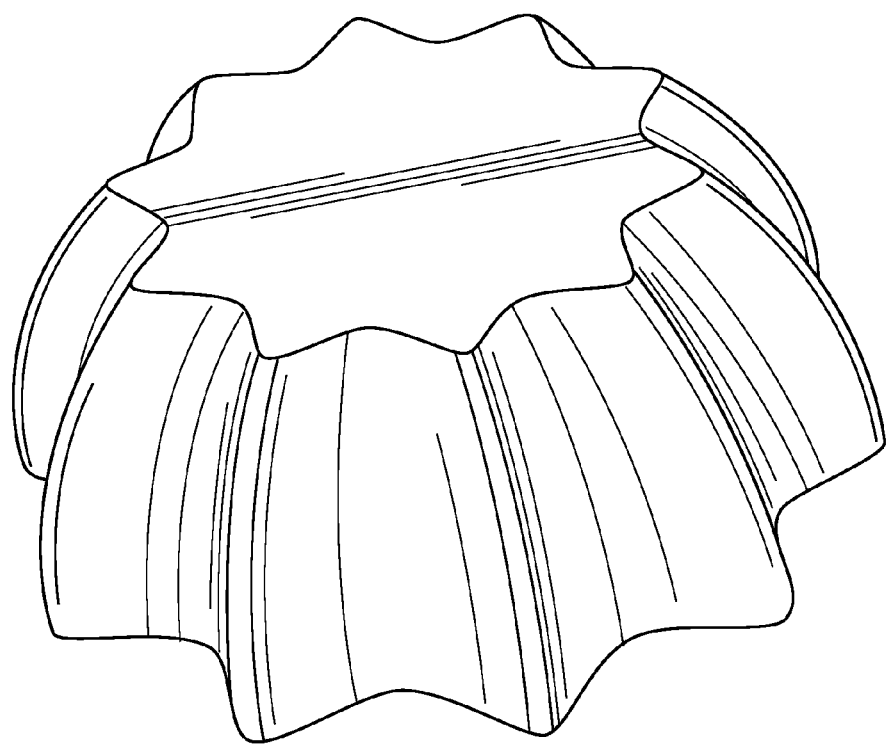
Figure 3B:
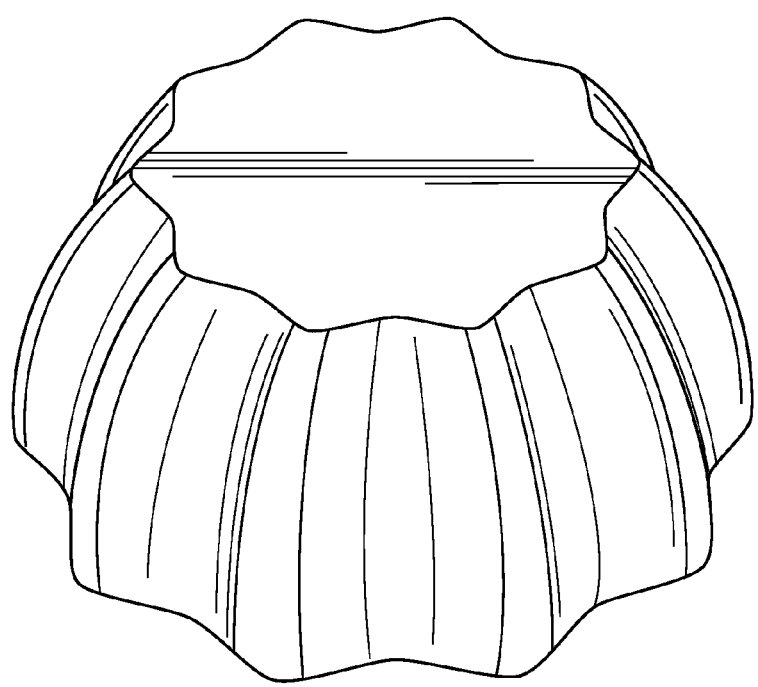
Figure 3C:
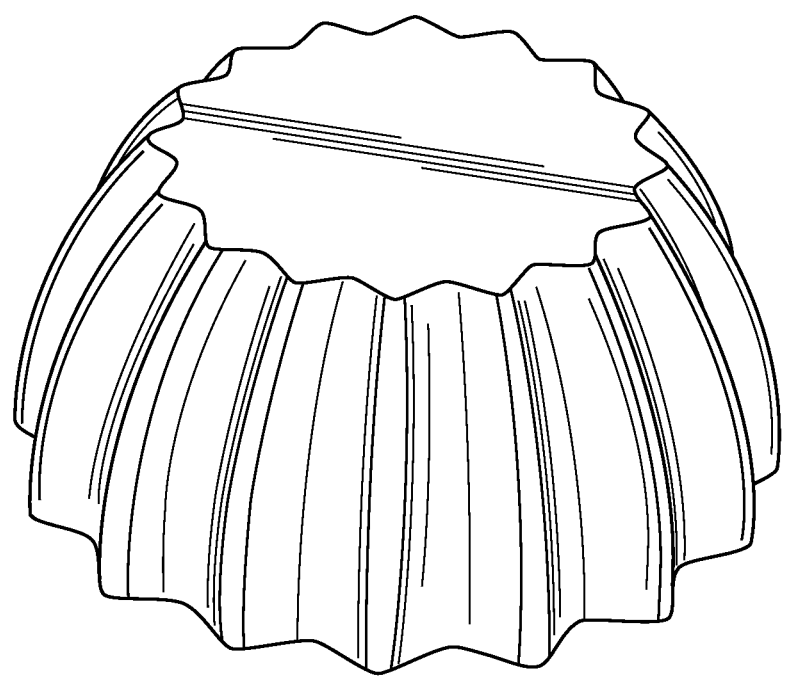
Figure 4A:
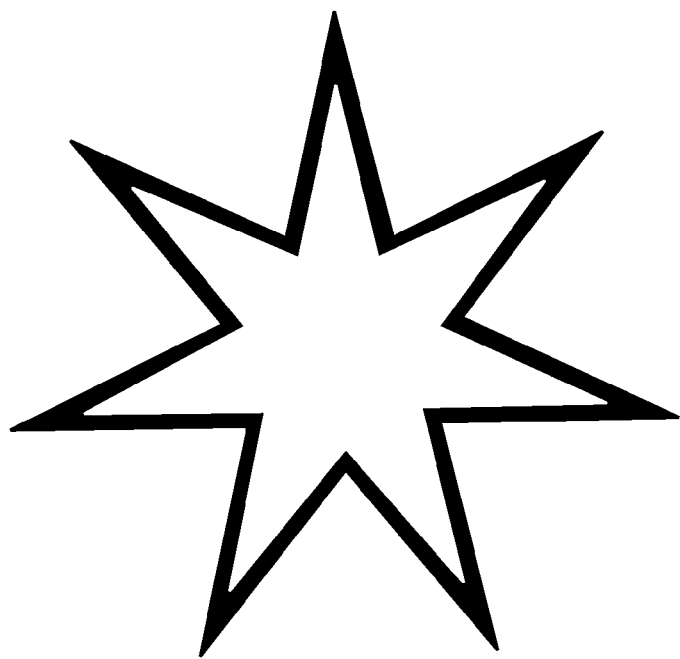
FIG. 4A is a top schematic view of a rippled surface of a light input interface according to an embodiment of the invention.

By way of illustration, FIGS. 3A-3C schematically illustrate exemplary embodiments of a light input interface according to the present teachings, which exhibit different oscillation frequencies and oscillation amplitudes. Further, these exemplary light input interfaces illustrate that a variety of different surface profiles can be employed to implement the surface oscillations. By way of example, in some embodiments, the surface profile can comprise a plurality of flat surface portions, where each two adjacent surface portions are tilted relative to one another and intersect along a ridge (FIG. 4A schematically depicts a cross-sectional view of such an embodiment). In other embodiments, the surface profile can include a plurality of curved surface portions. By way of example, the cross-sectional profile of the surface oscillations can be characterized as a harmonic or non-harmonic oscillation. For example, the cross-section of the surface oscillations in a plane perpendicular to the optical axis (OA) can be characterized by a plurality of sinusoidal oscillations.

Figure 4B:
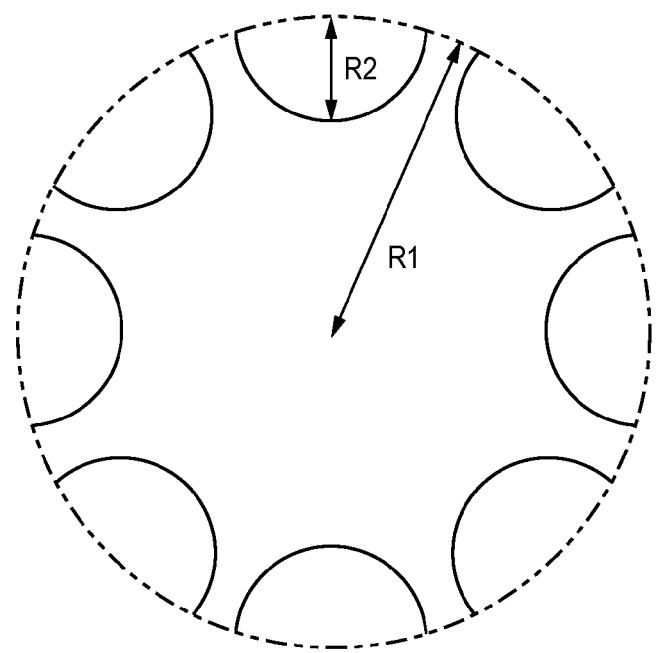
FIG. 4B is a top schematic view of a rippled surface of a light input interface according to an embodiment of the invention.

By way of further example, the surface profile can comprise a circular cross-section having a radius R1 and a plurality of semi-circular recesses having a radius R2 formed about the periphery thereof (FIG. 4B schematically depicts a cross-sectional view of such an embodiment). The R1 and R2 can be selected to provide a ratio R1/R2 having any of a variety of values, e.g., in a range of about 9 to about 100. While in this embodiment, the center of each of the semi-circular recesses having a radius R2 is on a circle defined by the radius R1, in other embodiments, the centers of one or more of the semi-circular recesses having a radius R2 can be offset relative to a circle defined by the radius R1.

Referring again to FIG. 1B, in use, at least a portion of the light rays emitted by the light source 16 is incident on the peripheral rippled surface 14a of the input interface 14. The incident light rays refract at the rippled peripheral surface 14a to enter the lens body 12. The undulations of the rippled peripheral surface cause the mixing of the light rays as they enter the lens body through that surface. In other words, a number of rays incident on the rippled peripheral surface refract at the surface undulations such that they intersect in the lens body as they propagate toward the peripheral surface 20 of the optic. By way of illustration, light rays A and B emitted from the light source 16 diverge as they propagate from the light source to the peripheral rippled surface 14a. These light rays enter the lens body via refraction at the rippled peripheral surface of the input interface such that they intersect at point (P) and then diverge again as they propagate toward the peripheral surface 20 of the optic. Such mixing of the light rays mediated by the peripheral rippled surface of the light input interface can advantageously enhance the uniformity of the light beam exiting the optic via the output surface 18. For example, in some embodiments, the mixing of the light by the input interface can reduce, and preferably eliminate, deviations between a desired light intensity profile and the light intensity profile obtained by using the optic.

Figure 5:
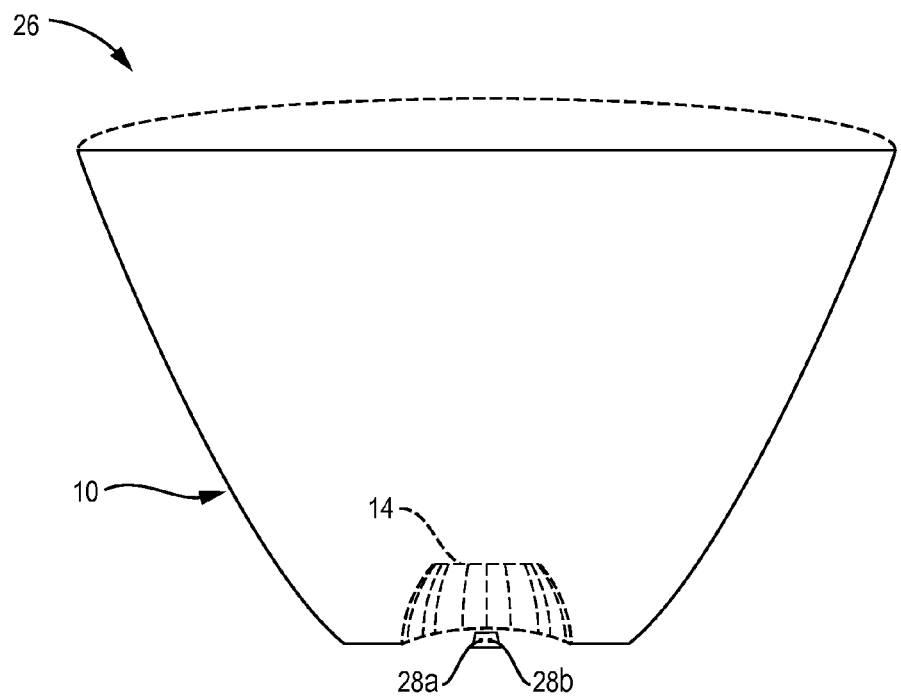
FIG. 5 is a schematic partial side view of an embodiment of a light mixing system according to the teachings of the invention, FIG. 6 schematically depicts a conventional lens receiving light from a light source, FIG. 7A schematically depicts a light input interface according to an embodiment of the invention having a top surface comprising a plurality of surface undulations, FIG. 7B schematically depicts a light mixing system according to an embodiment of the invention, FIG. 7C schematically depicts a light input interface of the light mixing system of FIG. 7B, wherein the light input interface includes a plurality of microlenses on a top surface thereof.

In some embodiments, the light uniformity can refer to the degree of the uniformity of far-field chromaticity of the light beam when the light entering the input interface can comprise a plurality of different colors. Alternatively or addition, the uniformity of the light can refer to a variation of the light intensity over cross-sectional area of the exiting beam, e.g., when one or more monochromatic light sources are employed. Further, the terms "near field" and "far field" are known in the art. To the extent that any further explanation might be needed, the term "near field" refers to a region whose maximum distance from the output surface of the lens is less than a threshold, e.g., equal to or less than a diameter (OD) of the output surface. The term "far field" refers to a region whose minimum distance from the output surface is significantly greater than a threshold, e.g., at least about 10, or at least about 20, or at least about 100 times greater than a diameter (OD) of the output surface. The near-field and the far-field regions can be separated by a transition region. By way of example, for an optic with an output surface having a diameter of 20 mm, the far field can extend from a distance of 200 mm from the output surface to infinity, and the near field can extend from the output surface to a distance of about 200 mm from the output surface In some embodiments, an optic according to the present teachings, such as the exemplary optic 10, can be used to mix light from a plurality of light sources emitting light of different colors. By way of example, FIG. 5 schematically depicts a light mixing system 26 according to the present teachings that includes two light sources 28a, 28b (in this example, two LEDs) that emit light of different colors and the optic 10, discussed above, that receives the light emitted by these sources to generate an output beam. The light input interface 14 causes mixing of the light from these two sources, and hence mixing of the colors, in a manner described above. In some embodiments, the mixing of the light of different colors by the optic 10 can reduce, and preferably eliminate, spatial variations in the far-field chromaticity associated with the output beam.

As known in the art, chromaticity can provide an objective measure of color regardless of luminance. For example, in C1ELUV chromaticity, the color can be defined by two coordinates (U, V) such that each point in a color space spanned by the axes U and V corresponds to a distinct color (chromaticity). In some embodiments, the system 26 can provide a substantially uniform far-field chromaticity. For example, the variation of CIELUV chromaticity across a far-field plane perpendicular to the propagation axis of a beam exiting the optic 10 can be less than about 0.001.

In some embodiments, the optic 10 can be employed to mix the light from a monochromatic light source so as to obtain a near-field and/or far-field light intensity profile that substantially matches a desired intensity profile. For example, the mixing of the light by the optic can reduce, and in some cases, eliminate high frequency variations, e.g., spikes, in the far-field light intensity profile that could otherwise arise in absence of the light mixing.

Figure 6:
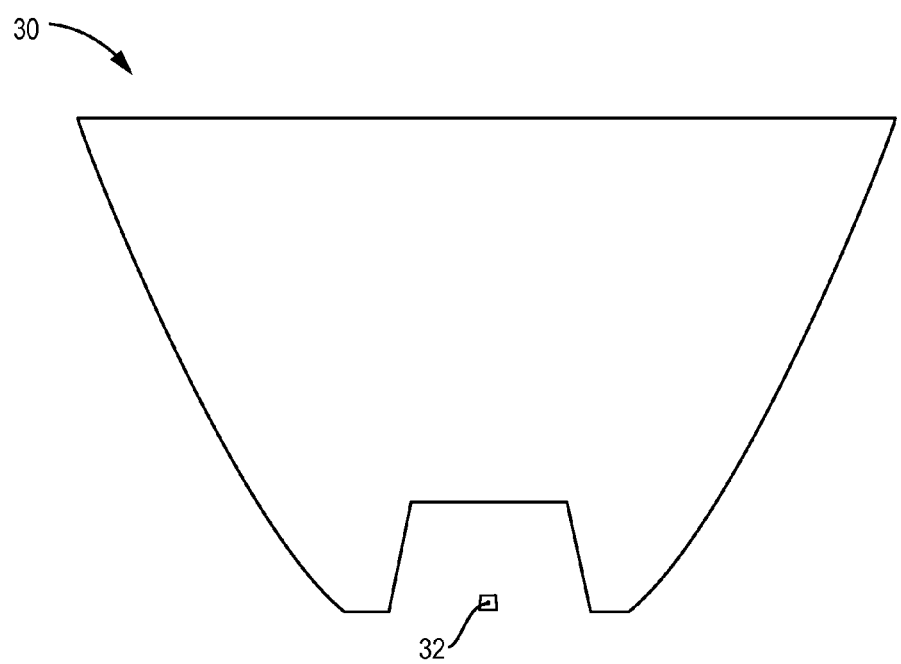

In contrast, a conventional lens 30, shown in FIG. 6, having a light input interface with a peripheral surface lacking surface undulations, does not cause mixing of the light rays entering the lens body through that peripheral surface. For example, the diverging light rays emitted by a light source 32 enter the lens body via refraction at the peripheral surface and propagate to the peripheral surface of the lens without intersecting one another within the lens body.

Referring again to FIG. 1A, the optic 10 can have a variety of dimensions. In some embodiments, the optic 10 can have a length (LO) along the optical axis that is less than about 100 mm, e.g., in a range of about 10 mm to about 100 mm. The length of the optic can be defined as the extension of the optic along the optical axis (OA) from a proximal end (PE) to a distal end (DE). For example, with reference to FIG. 1A, the length of the optic 10 is herein defined as the distance along the optical axis (OA) between the intersection of the optical axis with the output surface 18 of the optic 10 (i.e., point A) and the intersection of the optical axis (OA) with a putative surface (S) containing the proximal points of the optic 10 (i.e., point B in this example). Further, in some embodiments, the light input interface 14 can have a length (LI) in a range of about 1 mm to about 100 mm, for example, about 3 mm in this embodiment. The length of the input interface 14 is herein defined as the distance along the optical axis between the intersection of the optical axis (OA) with the top surface 14*b* of the input interface and the point (B). Thus, in some embodiments, a compact optic can be provided that can cause effective mixing of the input light, e.g., to achieve desired near-field and far-field light intensity profile(s) and/or uniform chromaticity.

Figure 7A:
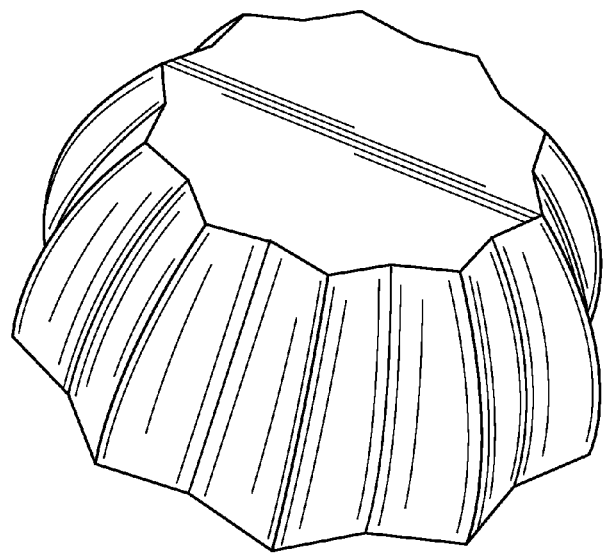
FIG. 7D is a top view of the light input interface depicts in FIG. 7C, FIG. 8 schematically depicts a light input interface according to an embodiment of the teachings of the invention, FIG. 9A schematically depicts an optic according to an embodiment of the invention.
Figure 7B:
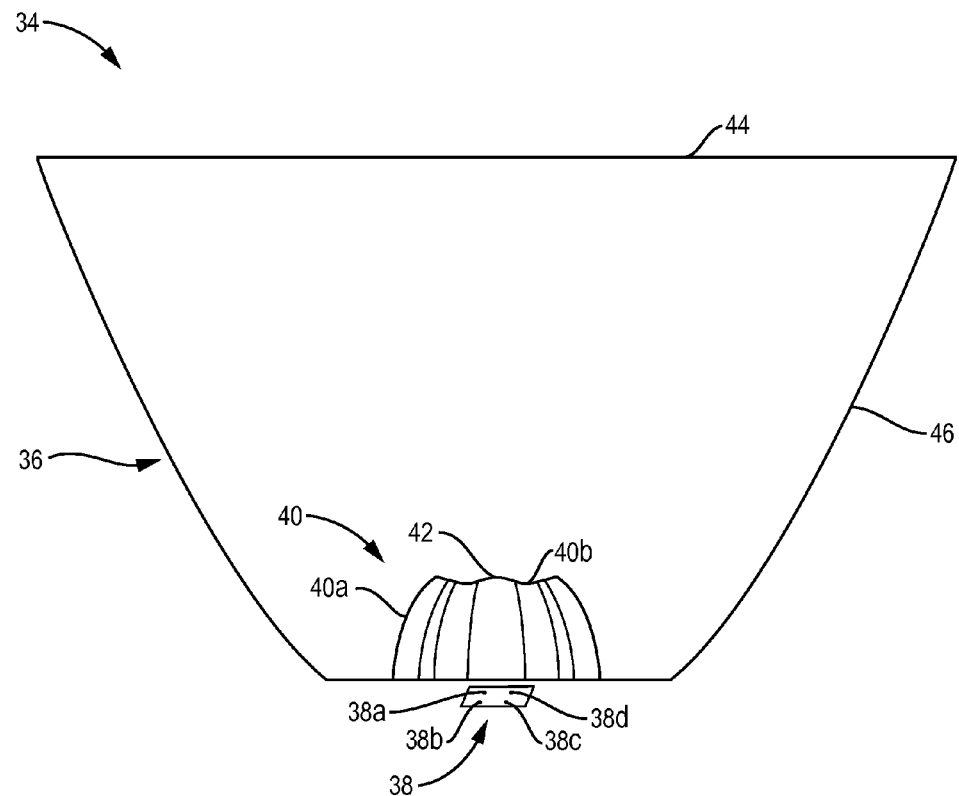
Figure 7C:
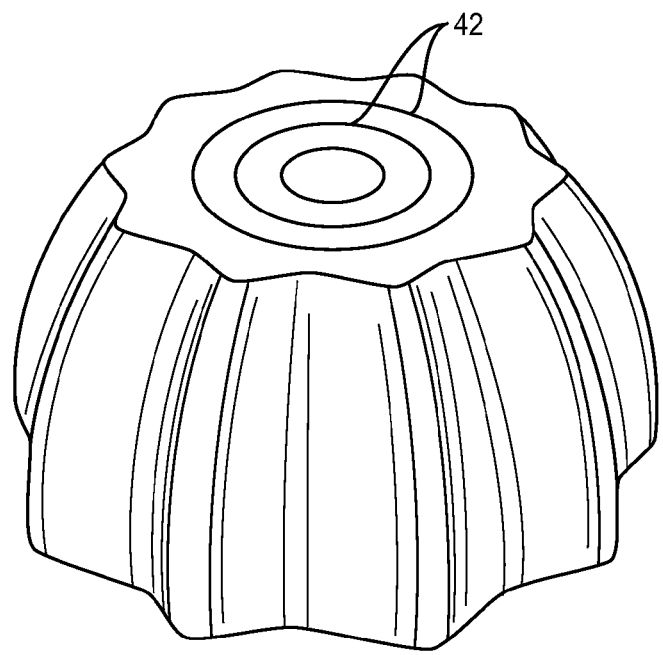
Figure 7D:
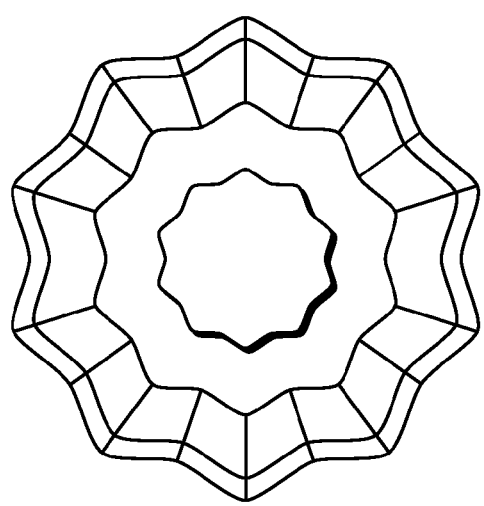

FIGS. 7A-7D schematically show that in some embodiments, the top surface 14*b* of the light input interface of an optic according to the present teachings can include a plurality of surface undulations 42 for mixing the light incident thereon from one or more light sources. In this illustrative embodiment, these surface undulations are in the form of a plurality of lenses, e.g., microlenses, disposed on the top surface 14*b* of the input interface 14. For example, FIG. 7B schematically depicts a light mixing system 34 according to an embodiment of the present invention that includes an optic 36 and a light source 38 that comprises four LEDs (38*a*, 38*b*, 38*c*, and 38*d*). Similar to the previous embodiments, the optic 36 includes a light input interface 40 having a rippled peripheral surface 40*a* that includes a plurality of surface undulations. In this embodiment, a top surface 40*b* of the input interface includes a plurality of microlenses 42 that cause mixing of the light incident on the top surface 40*b* from the LEDs as they enter the lens body via refraction at that surface and propagate to an output surface 44 of the optic for exiting the optic. Such mixing of the light by the microlenses 42 can have a number of advantages. For example, it can reduce, or preferably eliminate, dark bands that could otherwise arise, in some cases, in the far-field illumination pattern due to separation of the LEDs from one another.

Figure 8:
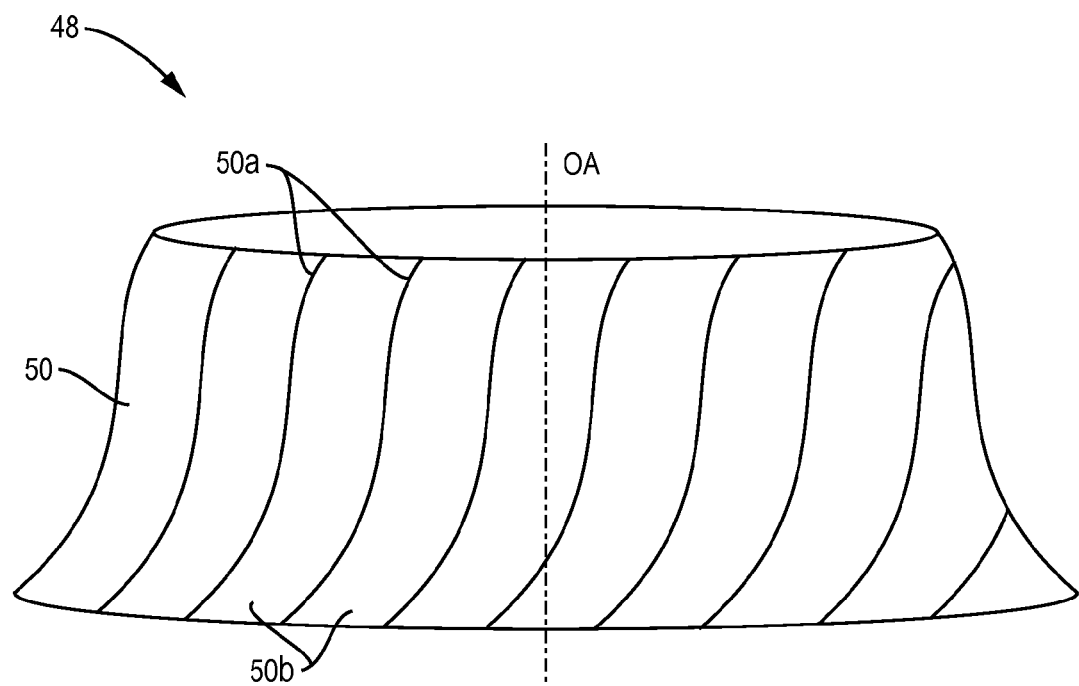

In some embodiments, the surface undulations of the peripheral surface of the input interface can comprise a plurality of surface oscillations, where the surface oscillations in one cross-sectional plane have a phase offset relative to the surface oscillations in an adjacent cross-sectional plane. In this manner, a plurality of longitudinally curved ridges and valleys can be provided. For example, FIG. 8 schematically depicts an example of an optic 48 according to such an embodiment in which an input interface 50 includes ridges 50*a* and valleys 50*b* that are curved along the longitudinal axis of the optic (OA). In some embodiments, the ridges 50*a* and the valleys 50*b* exhibit oscillations along the longitudinal axis.

Figure 9A:
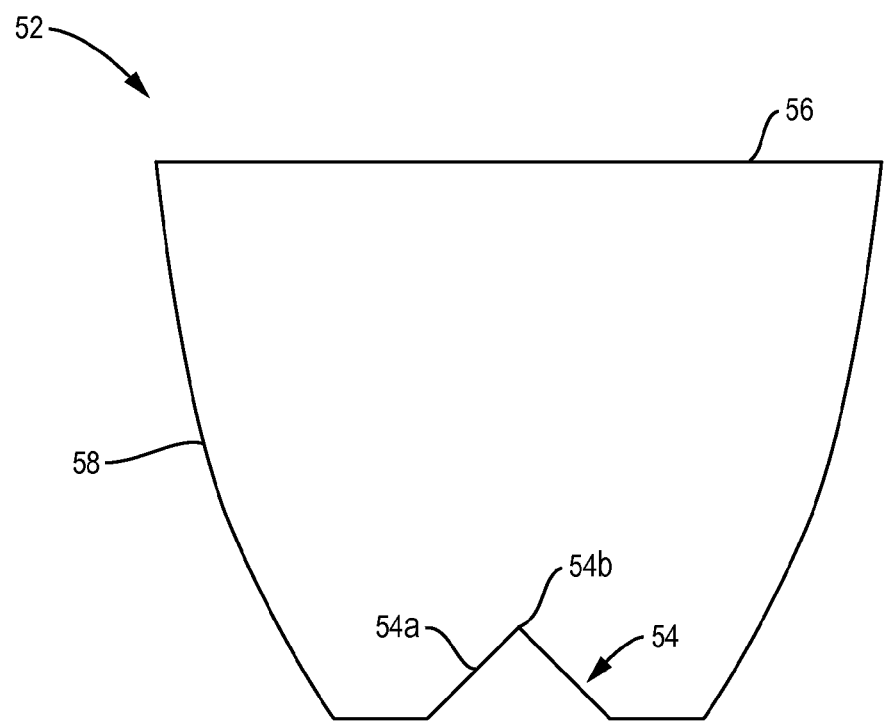
FIG. 9B is a schematic perspective view of a light input interface according to an embodiment of the invention.
FIG. 9C is a schematic top view of the light input interface of FIG. 9B.
FIG. 9D is a schematic perspective view of a light input interface according to an embodiment of the invention.
FIG. 9E is a schematic top view of the light input interface of FIG. 9D.
FIG. 9F is a schematic perspective view of a light input interface according to an embodiment of the invention.
FIG. 9G is schematic top view of the light input interface of FIG. 9F, FIG. 10 schematically depicts an optic according to an embodiment of the invention.

FIG. 9A schematically depicts an optic 52 according to another embodiment of the present teachings, which similar to the previous embodiments includes a light input interface 54, an output surface 56, and a peripheral surface 58 for redirecting light received from the input interface to the output surface. Similar to the previous embodiments, the light input interface 54 includes a rippled peripheral surface 54*a*. In this embodiment, however, the rippled peripheral surface 54*a* of the input interface extends to a point 54*b*, rather than a top surface similar to the surface 14*b* of the above optic 10. For example, in some embodiments, the rippled peripheral surface 54*a* can be characterized as a putative three-dimensional parabolic surface on which a plurality of surface undulations are superimposed, where the top point of the input interface corresponds to the apex of the parabolic surface.

Figure 9B:
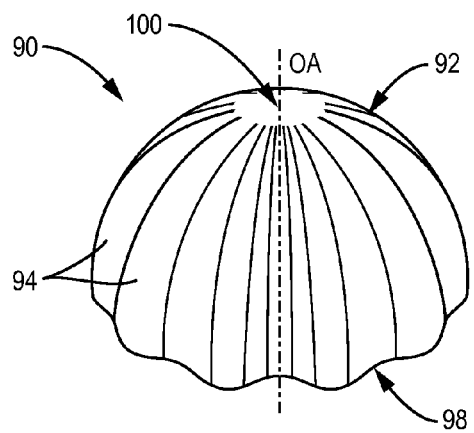
Figure 9C:
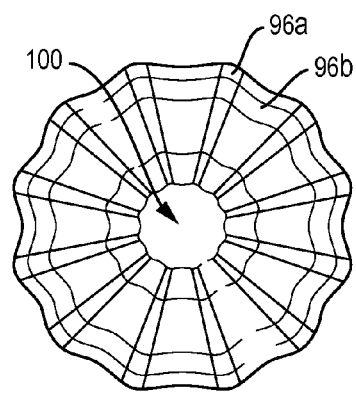

By way of further illustration, FIGS. 9B and 9C depict a light input interface 90 according to some embodiments, which includes an optical surface 92 disposed about an optical axis (OA), where the surface 92 exhibits a plurality of surface undulations (ripples) 94. The optical surface can be characterized as a putative base surface, e.g., a hemispherical surface, on which a plurality of surface undulations are disposed. In this embodiment, the surface undulations are in the form of a plurality of periodic surface oscillations generating ridges and troughs (such as ridge 96*a* and trough 96*b*) that extend from a base 98 of the surface toward a top portion 100 thereof that is free of ridges and troughs. In this embodiment, the ridges and troughs do not reach the optical axis (OA). In some embodiments, the top surface portion 100 that is free of ridges and troughs can be a substantially flat surface portion. Alternatively, the top surface portion 100 can be curved. In other implementations, the ridges and the troughs can extend from the base 98 of the surface to the apex of the surface, e.g., the intersection of the surface with the optical axis (OA). Similar to the previous embodiments, the light input interface 90 can form an input surface of an optic to receive light from a light source. Specifically, the surface 92 provides a cavity through which light from a light source (not shown) can be coupled into an optic (not shown) for which the surface 92 provides an input surface for receiving the light. The surface undulations of the light input surface can cause mixing of the light rays as they enter the optic. Similar to the above optic 10, such an optic can include an output surface to receive the light entering the optic via the light input interface, e.g., directly or in some cases via reflection at a peripheral surface, to allow the light to exit the optic.

Figure 9D:
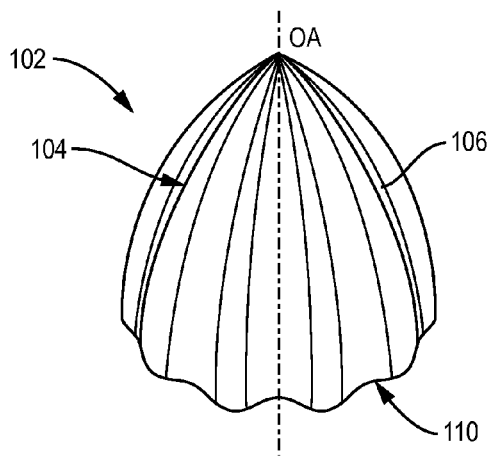
Figure 9E:
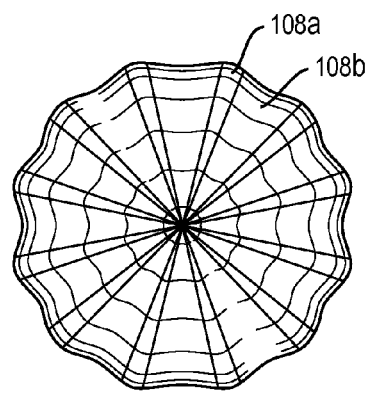

FIGS. 9D and 9E schematically depict another embodiment of a light input interface 102 that includes an optical surface 104 disposed about an optical axis (OA), where the surface exhibits a plurality of surface undulations 106. In this embodiment, the surface undulations are in the form of a plurality of periodic oscillations that form ridges and troughs, such as illustrated ridge 108a and trough 108b, that extend from a base 110 of the surface to the optical axis (OA). The surface 104 has a different putative base profile than the base profile of the surface 92 discussed above. Further, the frequency of the surface oscillations in this embodiment is different from the respective frequency of the surface oscillations of the light input interface 90 discussed above. Similar to the previous embodiments, the optical surface 104 can provide an input surface of an optic for receiving light from a light source (not shown) and coupling the received light, or at least a portion thereof, into the optic.

Figure 9F:
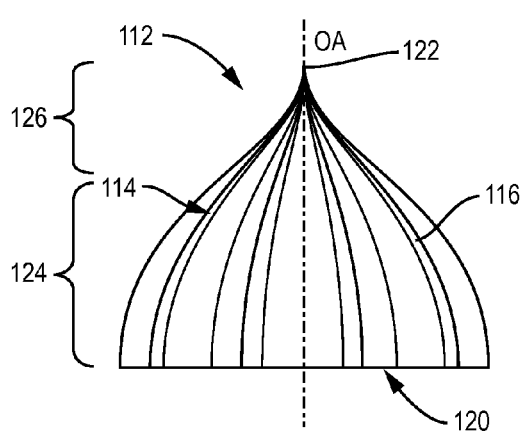
Figure 9G:
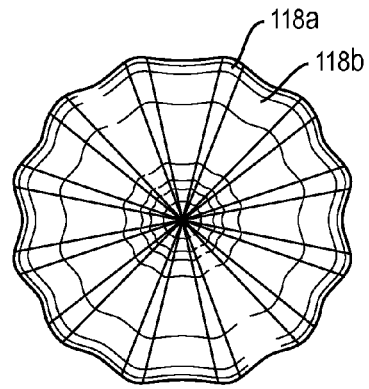

As discussed above, a light input interface according to the present teachings can have a variety of base profiles as well as undulation frequencies. By way of another example, FIGS. 9F and 9G depict another light input interface 112 according to the present teachings, which includes an optical surface 114 for receiving light from a light source, where the surface 114 is disposed about an optical axis (OA) and includes a plurality of surface undulations 116. The surface undulations extend as a plurality of ridges and troughs (e.g., ridge 118a and trough 118b) from a base 120 to an apex 122, which is the intersection of the surface with the optical axis. The base profile of the undulating surface of this light input interface includes a lower concave portion 124 and an upper convex portion 126. Again, similar to the previous embodiments, the optical surface 114 can function as an input surface of an optic for receiving light from a light source (not shown) and coupling the light into the optic.

Figure 10:
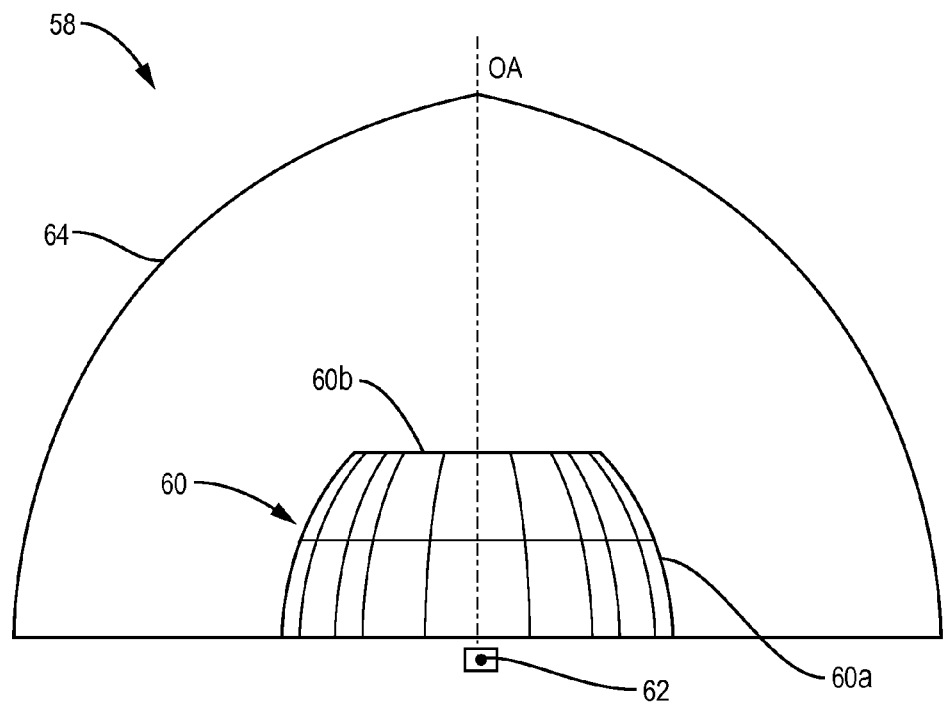

FIG. 10 schematically depicts an optic 58 according to another embodiment of the present teachings having a light input interface 60 for receiving light from a light source 62. In particular, in this embodiment, the light input interface 60 provides a cavity for receiving light from a light source. In some embodiments, the cavity receives the light source, or a portion thereof, while in other embodiments, the light source is positioned outside the cavity but is optically coupled thereto for delivering at least a portion of its emitted light to the light input interface. Similar to the previous embodiments, the light input interface 60 includes a peripheral rippled surface 60a, such as the rippled surfaces discussed above. In this embodiment, the light input interface 60 further includes a top surface 60b, which is substantially flat. In other embodiments, the top surface 60b can include a plurality of surface undulations, e.g., microlenses. Further, in some embodiments, rather than having a top surface, the light input interface can terminate in a point, e.g., similar to the light input interfaces shown in FIGS. 9A, 9D, and 9F discussed above.

The optic 58 further includes an output surface 64 that is configured to receive the light that enters the lens body via the input interface 60. Such received light that is incident on the output surface 64, or at least a portion thereof, refracts at that surface to exit the lens body. In this embodiment, the output surface has a dome-like shape. For example, the shape of the output surface can be generated by rotation of a parabola about an axis of symmetry, e.g., in this case the optical axis (OA). While in this embodiment the output surface 64 is rotationally symmetric about the optical axis (OA), in other embodiments, it can be asymmetric.

Similar to the previous embodiments, the rippled peripheral surface of the light input interface 60a causes mixing of the light rays incident thereon such that many of these light rays intersect one another in the lens body as they propagate to the output surface 64. In some embodiments, such mixing of the input light rays can, for example, enhance the uniformity of far-field chromaticity and/or reduce intensity variations, e.g., spikes, in the near-field or far-field intensity profile of the light exiting the lens body through the output surface 64. For example, the exiting light can exhibit a chromaticity uniformity in the ranges discussed above.

In some embodiments, the light source 62 can generate light of different colors. For example, in some embodiments, the light source 62 can include a plurality of light sources (e.g., a plurality of LEDs), each of which generates light of a different color. In such embodiments, the rippled peripheral surface 60a of the light input interface 60 can cause mixing of the light of different colors such that the far-field chromaticity of the light exiting the output surface exhibits a desired uniformity, such as those discussed above.

Figure 11:
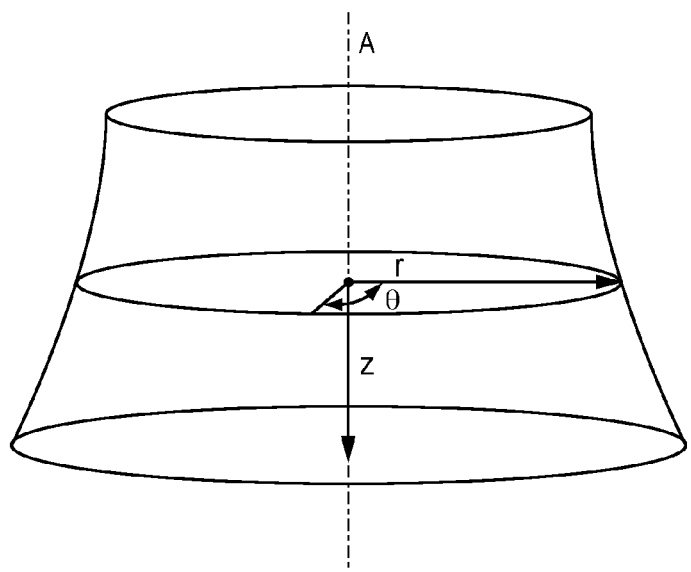
FIG. 11 shows radial and angular variables for mathematically defining a rippled surface of a light input interface in accordance with some embodiments of the invention.

In some embodiments, a rippled peripheral surface of a light input interface of an optic according to the present teachings can be designed by initially choosing a base curved surface for the peripheral surface and superimposing a plurality of surface undulations on the base curved surface. By way of example, in some embodiments, the surface profile of the rippled peripheral surface of the light input interface can be defined by the following relation:

$$r(z,\theta)=R_0(z)+F(z,\theta) \qquad \text{Equation (1)}$$

where, as shown schematically in FIG. 11, $r(z, \theta)$ denotes the radial position of the undulating surface from a reference axis (e.g., central axis (OA)) as a function of longitudinal distance (z) along that axis (A) and azimuthal angle ($\theta$), $R_0(z)$ denotes radial positions of a putative base curved surface from the reference axis as a function of longitudinal distance (z) along that axis, $F(z, \theta)$ denotes undulations superimposed on the base curved surface as a function of distance (z) along the reference axis (A) and azimuthal angle ($\theta$) around that axis. In many embodiments, $F(z, \theta)$ is periodic in variable ($\theta$).

$R_0(z)$ can be any suitable function, and can be selected based on a variety of considerations, such as, a particular application for which the optic is intended, the intensity distribution of light emitted by a light source coupled to the optic, size limitations, etc. For example, in some embodiments, $R_0(z)$ can denote a parabola or a portion thereof.

Figure 12:
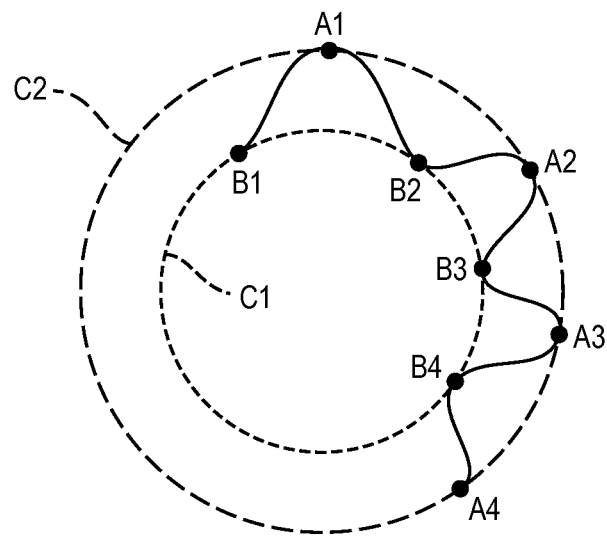
FIG. 12 shows radial constraints employed in a method according to an embodiment for designing a rippled surface of a light input interface according to the teachings of the invention, and FIG. 13 schematically depicts an optic according to an embodiment of the invention.

Further, $F(z, \theta)$ can be selected in a variety of ways. For example, in some embodiments, it can be an analytical oscillatory function, e.g., a sine or cosine function. In some embodiments, it can be defined iteratively so as to optimize a merit function, e.g., variation of the far-field chromaticity. By way of example, with reference to FIG. 12, in a given cross-sectional plane orthogonal to the central axis (OA), the amplitude of the surface undulations can be confined between two putative circles (C1) and (C2). A number of points A1, A2, A3, A4 on the outer circle (C2) and a number of points B1, B2, B3, B4, B5 on the inner circle (C1) can be selected and the surface undulation profile can be constructed by defining each segment connecting one of the point A1 to a respective point B2. In some cases, a spline, e.g., a cubic spline, can be employed to interpolate between these points to generate the cross-sectional undulating profile. The cross-sectional undulating profile can then be extended, with appropriate size (and/or phase) scaling, longitudinally along the putative base surface to generate the undulating surface.

Figure 13:
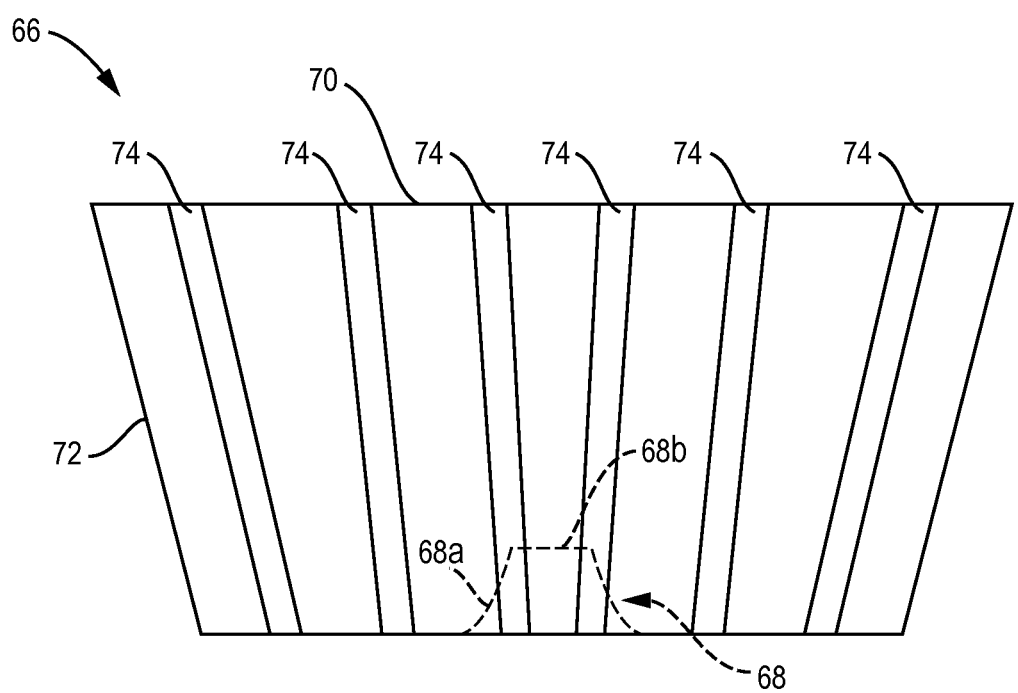

In some embodiments, the peripheral surface of an optic according to the present teachings, which is configured to redirect light received from the input interface to the output surface of the optic, can be fluted. By way of example, FIG. 13 schematically depicts an optic 66 according to such an embodiment, which includes a light input interface 68 having a rippled peripheral surface 68a and a top surface 68b, an output surface 70 and a peripheral surface 72, which is configured to receive at least a portion of the light entering the lens body via the rippled peripheral surface 68a and redirect that light to the output surface 70 for exiting the optic. In this embodiment, the peripheral surface 72 is a generally curved surface that includes a plurality of substantially flat portions 74. In other words, the peripheral surface 72 includes alternating curved and flat surface portions.

The optics according to the present teachings can be manufactured by utilizing a variety of different materials and manufacturing techniques. Generally, the optics can be formed of a material that is substantially transparent to visible radiation. In some embodiments, the material from which the optics is formed can exhibit an index of refraction in a range of about 1.4 to about 1.7 in the visible portion of the electromagnetic spectrum. Some suitable materials for forming the optics can include, without limitation, polymethyl methacrylate (PMMA), glass, polycarbonate, cyclic olefin copolymer and cyclic olefin polymer.

Some suitable manufacturing techniques for fabricating the optics according to the present teachings can include, for example, injection molding and compression molding.

The optics according to the present teachings can provide the advantages discussed above, such as enhanced uniformity of chromaticity. In addition, in some embodiments, the optics can advantageously ameliorate the tight alignment tolerances that are typically needed between a light source and a conventional optic for obtaining a desired output light distribution. In particular, in some embodiments, the mixing of the light rays by the peripheral surface of the input interface can allow some degree of misalignment between the optic and the light source without significantly degrading a desired distribution (pattern) of the output light.

Those having ordinary skill in the art will appreciate that various changes can be made to the above embodiments without departing from the scope of the invention.

The invention claimed is:

1. An optic, comprising
   a lens body, comprising
   a light input interface configured to receive light generated by a light source, said light input interface having a rippled surface comprising a plurality of periodic surface oscillations exhibiting an oscillation amplitude of at least about 10 microns, through which at least a portion of the received light enters the lens body,
   an output surface through which light exits the lens body, and
   a peripheral surface configured to receive at least a portion of the light entering the lens body via said rippled surface and to redirect at least a portion of said received light to the output surface via total internal reflection, so as to provide an output beam having a far-field chromaticity with a variation less than about 0.001 across a far-field plane perpendicular to a propagation axis of said output beam.

2. The optic of claim 1, wherein said peripheral surface of the optic is configured to redirect the received light via specular reflection.

3. The optic of claim 1, wherein said peripheral surface of the optic is configured to redirect the received light so as to form a substantially collimated light beam for exiting the lens body through said output surface.

4. The optic of claim 1, wherein said peripheral surface of the optic comprises a plurality of flat and a plurality of curved surface portions.

5. The optic of claim 1, wherein said periodic surface oscillations exhibit a uniform oscillation amplitude.

6. The optic of claim 1, wherein said periodic surface oscillations exhibit a non-uniform amplitude.

7. The optic of claim 1, wherein said oscillation amplitude is in a range of about 10 microns to about 1 mm.

8. The optic of claim 1, wherein said periodic surface oscillations exhibit an oscillation frequency in a range of about $5/\pi$ to about $180/\pi$ $(radian)^{-1}$.

9. The optic of claim 1, wherein said rippled surface forms an inner peripheral surface of said optic.

10. The optic of claim 9, wherein said light input interface further comprises a top surface adapted to receive a portion of the light generated by the light source and to direct at least part of said received light into the lens body.

11. The optic of claim 10, wherein said top surface of the light input interface is substantially flat.

12. The optic of claim 10, wherein said top surface of the light input interface is curved.

13. The optic of claim 10, wherein said top surface of the light input interface comprises a plurality of surface undulations.

14. The optic of claim 13, wherein said surface undulations of the top surface of the light input interface comprise a plurality of microlenses.

15. The optic of claim 1, wherein said rippled surface of the light input interface extends from a base of the light input interface to a top surface portion of the light input interface that is free of surface undulations.

16. The optic of claim 1, wherein said rippled surface of the light input interface extends from a base of the light input interface to an apex thereof.

17. The optic of claim 1, wherein said lens body is characterized by an optical axis.

18. The optic of claim 17, wherein a ratio of a length of said light input interface along said optical axis relative to a length of said lens body along said optical axis is in a range of about 0.1 to about 1.

19. An optic, comprising: a light input interface adapted to receive light from a light source, said light input interface having a rippled surface at which a portion of the received light is refracted to enter the optic, and output surface; and a peripheral surface configured to receive at least a portion of the light rays refracted by the rippled surface and to direct said received rays via total internal reflection as a substantially collimated light beam to said output surface for exiting the optic, wherein said rippled surface exhibits periodic surface oscillations with an amplitude in a range of about 10 microns to about 1 mm and an oscillation frequency in a range of about 57 to about 180/7 $(radian)^{-1}$, wherein said rippled surface comprises a plurality of ridges and troughs extending from a base of the light input interface toward an apex of the light input interface.

20. The optic of claim 19, wherein said ridges and troughs reach said apex.

21. The optic of claim 19, wherein said periodic surface oscillations exhibit a uniform oscillation amplitude.

22. The optic of claim 19, wherein said periodic surface oscillations exhibit a non-uniform oscillation amplitude.

23. The optic of claim 19, wherein said optic comprises an optical axis about which said light input interface and said output surface are disposed.

24. The optic of claim 23, further comprising a lens body along said optical axis, wherein a ratio of a length of said light input interface along said optical axis relative to a length of said lens body along said optical axis is in a range of about 0.1 to about 1.

25. The optic of claim 1, wherein the rippled surface is configured such that a plurality of light rays entering the lens body through the rippled surface intersect within the lens body.

26. An optic, comprising
a lens body, comprising
a light input interface configured to receive light generated by a light source, said light input interface having a rippled surface comprising a plurality of periodic surface oscillations that exhibit a non-uniform amplitude, through which at least a portion of the received light enters the lens body,
an output surface through which light exits the lens body, and
a peripheral surface configured to receive at least a portion of the light entering the lens body via said rippled surface and to redirect at least a portion of said received light to the output surface for exiting the lens body.

27. An optic, comprising
a lens body, comprising
a light input interface configured to receive light generated by a light source, said light input interface having a rippled surface extending from a base of said light input interface to an apex thereof, through which at least a portion of the received light enters the lens body,
an output surface through which light exits the lens body, and
a peripheral surface configured to receive at least a portion of the light entering the lens body via said rippled surface and to redirect at least a portion of said received light to the output surface for exiting the lens body.

* * * * *